(12) United States Patent
Kohinata et al.

(10) Patent No.: US 7,162,110 B2
(45) Date of Patent: Jan. 9, 2007

(54) THERMOSETTING ADHESIVE FOR OPTICAL USE, OPTICAL ISOLATOR ELEMENT MADE WITH THE ADHESIVE, AND OPTICAL ISOLATOR

(75) Inventors: Shigeru Kohinata, Tokyo (JP); Daiki Shiga, Tokyo (JP)

(73) Assignee: Sumitomo Metal Mining Co., Ltd, Tokyo (JP)

( * ) Notice: Subject to any disclaimer, the term of this patent is extended or adjusted under 35 U.S.C. 154(b) by 141 days.

(21) Appl. No.: 10/519,831

(22) PCT Filed: Dec. 12, 2002

(86) PCT No.: PCT/JP02/12995

§ 371 (c)(1),
(2), (4) Date: Jan. 10, 2005

(87) PCT Pub. No.: WO2004/009722

PCT Pub. Date: Jan. 29, 2004

(65) Prior Publication Data

US 2005/0249446 A1    Nov. 10, 2005

(30) Foreign Application Priority Data

Jul. 18, 2002  (JP) ............................. 2002-209754
Dec. 5, 2002  (JP) ............................. 2002-353752

(51) Int. Cl.
*G02B 6/00*    (2006.01)
(52) U.S. Cl. .......................................... 385/11; 528/34
(58) Field of Classification Search ................. 385/11; 528/34
See application file for complete search history.

(56) References Cited

U.S. PATENT DOCUMENTS

| | | | |
|---|---|---|---|
| 2006/0006362 A1* | 1/2006 | Miyawaki et al. | 252/299.01 |
| 2006/0054053 A1* | 3/2006 | Masutani et al. | 106/2 |
| 2006/0135723 A1* | 6/2006 | Nakayama | 528/10 |

FOREIGN PATENT DOCUMENTS

| | | | | |
|---|---|---|---|---|
| JP | 62-290783 | | | 12/1987 |
| JP | 5-257025 | | | 10/1993 |
| JP | 6-73359 | | | 3/1994 |
| JP | 2000044914 | A | * | 2/2000 |
| JP | 2000-144089 | | | 5/2000 |
| JP | 2000-155289 | | | 6/2000 |
| JP | 2000-249983 | | | 9/2000 |
| JP | 2001-21838 | | | 1/2001 |
| JP | 2003037368 | A | * | 2/2006 |
| JP | 2002201369 | A | * | 7/2006 |
| WO | WO 00/17698 | A1 | | 3/2000 |

* cited by examiner

*Primary Examiner*—Ellen E. Kim
(74) *Attorney, Agent, or Firm*—Armstrong, Kratz, Quintos, Hanson & Brooks, LLP

(57) ABSTRACT

The thermoset optical-purpose adhesive according to the present invention, having a superior resistance to heat and moisture and a high transparency is a mixed adhesive which is mainly composed of a primary agent and a curing agent, and is characterized by having a visible-ray transmittance of 90% or more after heat curing under conditions of a layer thickness that is enough for the adhesive to function as an adhesive. It is also characterized in that the primary agent is constituted of a silane modified epoxy resin whose active-radical moieties other than epoxy radicals have been inactivated in part or in entirety by the aid of a metallic soap and to at least one epoxy radical of which a silane coupling agent has been attached, and the curing agent is constituted of an amine type compound or an amide type compound.

12 Claims, 5 Drawing Sheets

SAMPLE NOT INSERTED

SAMPLE INSERTED

THERMOSETTING ADHESIVE FOR OPTICAL USE, OPTICAL ISOLATOR ELEMENT MADE WITH THE ADHESIVE, AND OPTICAL ISOLATOR

This application is a 371 of PCT/JP02/12995, filed on Dec. 12, 2002.

TECHNICAL FIELD

This invention relates to a thermoset optical-purpose adhesive of a mixed type composed mainly of a primary agent epoxy resin or the like and a curing agent amine type compound or the like. More particularly, this invention relates to a thermoset optical-purpose adhesive having a superior resistance to heat and moisture and also a high transparency, and an optical isolator element and an optical isolator to both of which this adhesive has been applied.

BACKGROUND ART

In optical communication and so forth, among light emitted from a semiconductor laser, the light reflected from an optical fiber or the like returns to the semiconductor laser again. This light having returned upon reflection (reflection return light) may cause mode hopping of the semiconductor laser to come greatly causative of a noise which makes unstable the light lased from the laser. Accordingly, in order to control such reflection return light, an optical isolator is used which utilizes the Faraday effect.

Basic constitution of the optical isolator is shown in FIG. 1. Stated specifically, as shown in FIGS. 1(A) and (B), this optical isolator is mainly constituted of a first polarizer 1 which is disposed along the optical axis and the plane of polarization of which is in non-phase-shift in the plane of polarization of incident light, a Faraday rotator 2 which is disposed on the rear of the light emergent side of this first polarizer 1 and rotates the plane of polarization of incident light by 45 degrees, and a second polarizer 3 which is disposed on the rear of the light emergent side of this Faraday rotator 2 and has the plane of polarization standing inclined by 45 degrees in respect to the first polarizer 1.

The Faraday rotator 2, the first polarizer 1 and the second polarizer 3 are joined with an optical-purpose adhesive at their interfaces to make up an optical isolator element, and also this optical isolator element, and permanent magnets 4 which bring into saturation magnetization the Faraday rotator 2 of this optical isolator element, are fastened by bonding to a holder 5 via the optical-purpose adhesive to make up an optical isolator.

Now, as conventional optical-purpose adhesives, those making use of an epoxy resin as a primary agent and an amine type compound as a curing agent are known in the art.

However, the conventional optical-purpose adhesives of this kind have a disadvantage that cured products tend to cause discoloration and deterioration which are due to temperature and humidity after curing. There have been problems such that, in a thermo-hygrostat test at 85° C./85% RH for 2,000 hours which is conducted using the optical isolator, the optical isolator element and the permanent magnets may come separate from the holder, and optical deterioration may arise because of peeling of the Faraday rotator and polarizers.

The present invention has been made taking note of such problems, and what it aims is to provide a thermoset optical-purpose adhesive having a superior resistance to heat and moisture and a high transparency, and also to provide an optical isolator element and an optical isolator to both of which this adhesive has been applied.

Accordingly, the present inventors have made extensive studies upon the cause of deterioration in the conventional optical isolators.

As the result, it has turned out that the cause of the discoloration and deterioration which are due to temperature and humidity after curing is concerned with the compounding proportion of the amine type curing agent to the primary agent epoxy resin, and resides in that the amine type curing agent is compounded in a proportion of more than 45 parts by weight based on 100 parts by weight of the epoxy resin. Incidentally, as a solution therefor, a method may be contemplated in which the amine type curing agent is compounded in a small proportion, but this may cause another problem that the heat curing takes place insufficiently, and hence it has been difficult in practice to set its proportion to 45 parts by weight or less.

It has also turned out that the cause of the separation of the optical isolator element and the permanent magnets from the holder and that of the optical deterioration because of peeling of the Faraday rotator and polarizers in a thermo-hygrostat test are concerned with the combination of the optical element and the epoxy resin, the former being inorganic and the latter being organic. Incidentally, as a solution there for, it may be contemplated to carry out silane modification treatment in which a silane coupling agent is attached to the epoxy radical of the epoxy resin to improve its affinity for the inorganic optical element. However, in the epoxy resin, active-radical moieties such as a hydroxyl radical are also present in addition to the epoxy radical, and it is difficult to attach the silane coupling agent only to the epoxy radical. Hence, it has been difficult in practice to solve the problem.

After the present inventors have elucidated the causes in this way, they have continued further studies. As the result, they have discovered that the silane coupling agent can be made to react selectively on the epoxy radical of the epoxy resin when a metallic soap is made present together in carrying out the silane modification treatment, and that this also enables reduction of the compounding proportion of the curing agent to 45 parts by weight or less. The present invention has been accomplished on the basis of such a technical discovery.

DISCLOSURE OF THE INVENTION

More specifically, the thermoset optical-purpose adhesive according to the present invention is a mixed adhesive which is mainly composed of a primary agent and a curing agent, and is characterized by having a visible-ray transmittance of 90% or more after heat curing under conditions of a layer thickness that is enough for the adhesive to function as an adhesive.

As the primary agent, usable is one in which its main component is constituted of a silane modified epoxy resin whose active-radical moieties other than epoxy radicals have been inactivated in part or in entirety by the aid of a metallic soap and to at least one epoxy radical of which a silane coupling agent has been attached. Also, as the curing agent, usable is one in which its main component is constituted of an amine type compound or an amide type compound. Here, as the amine type compound or amide type compound constituting the main component of the curing agent, desirable is one which has been made into a latent amine addition product upon reaction with the epoxy resin. Still also, presupposing that the main component of the primary agent is constituted of a silane modified epoxy resin whose active-radical moieties other than epoxy radicals have been inactivated in part or in entirety by the aid of a metallic soap and to at least one epoxy radical of which a silane coupling agent has been attached, the compounding proportion of the curing agent to the primary agent epoxy resin may be so set that the curing agent is in the range of from 20 parts by weight to 45 parts by weight based on 100 parts by weight of the epoxy resin.

The optical isolator element according to the present invention is mainly constituted of a Faraday rotator, and a first polarizer and a second polarizer which are respectively disposed on both sides of the Faraday rotator, and is characterized in that the Faraday rotator, the first polarizer and the second polarizer are joined at their interfaces by means of the above thermoset optical-purpose adhesive according to the present invention.

The optical isolator according to the present invention is an optical isolator comprising an optical isolator element and a permanent magnet which brings into saturation magnetization a Faraday rotator of this optical isolator element; the optical isolator element and the permanent magnet being fastened to a holder; and is characterized in that the optical isolator element and the permanent magnet are fastened by bonding to the holder by means of the above thermoset optical-purpose adhesive according to the present invention.

BEST MODES FOR PRACTICING THE INVENTION

Figure 1:
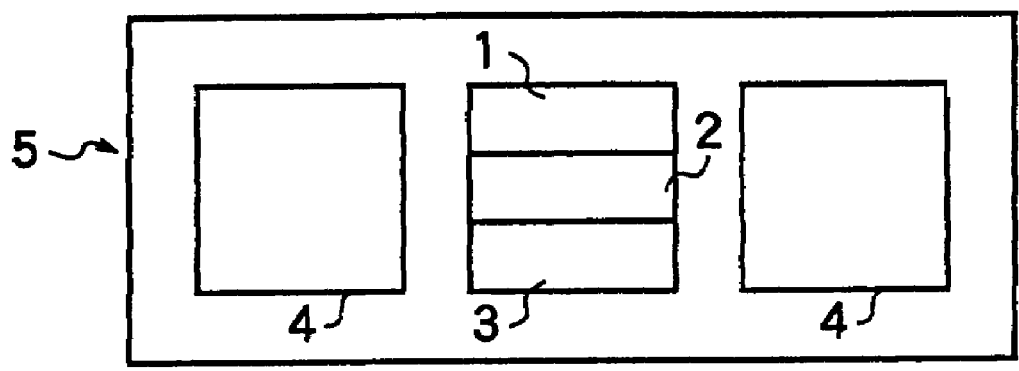
FIG. 1(A) is a top plan view of an optical isolator and FIG. 1(B) is a side view of the optical isolator.
Figure 1:
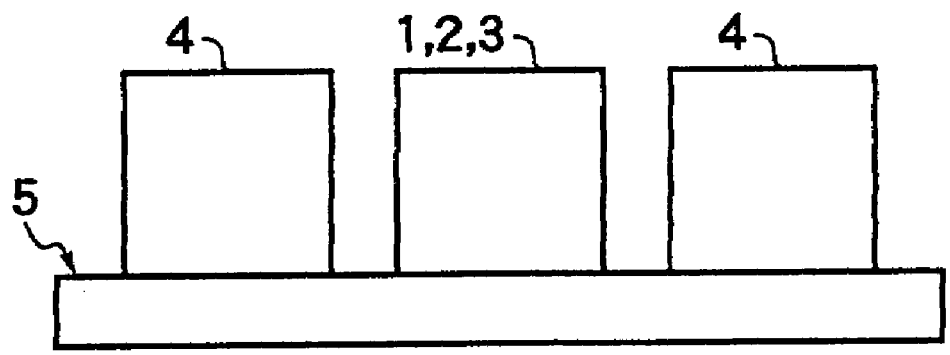

The present invention is described below in greater detail with reference to the accompanying drawings.

To the outset, the thermoset optical-purpose adhesive according to the present invention is, as mentioned above, a mixed adhesive which is mainly composed of a primary agent and a curing agent, and is characterized by having a visible-ray transmittance of 90% or more after heat curing under conditions of a layer thickness that is enough for the adhesive to function as an adhesive. Here, the conditions of a layer thickness that is enough for the adhesive to function as an adhesive refers to conditions in which a layer of the adhesive has a layer thickness within the range of from 2.0 μm to 3.5 mm as measured with an optical measure microscope (e.g., a microscope manufactured by Olympus Optical Co., Ltd.) capable of making measurement in the depth direction. If the layer thickness is less than 2.0 μm, the adhesive may have a poor resistance to heat and moisture. If it is more than 3.5 mm, the visible-ray transmittance may come lower than the above numerical conditions.

As the primary agent, it may include a silane modified epoxy resin whose active-radical moieties other than epoxy radicals have been inactivated in part or in entirety by the aid of a metallic soap and to at least one epoxy radical of which a silane coupling agent has been attached.

Here, as the epoxy resin usable in the present invention, it is an epoxy resin having more than one epoxy radical in one molecule, and may be exemplified by bisphenol A, bisphenol AD, bisphenol F and hydrogenated bisphenol A; polyglycidyl ethers obtained by allowing polyhydric phenols such as catechol and resorcin to react with epichlorohydrin; glycidyl ether esters obtained by allowing hydroxycarboxylic acids such as p-hydroxybenzoic acid and β-hydroxynaphthoic acid to react with epichlorohydrin; polyglycidyl esters obtained from polycarboxylic acids such as phthalic acid and terephthalic acid; and also novolak type epoxy, and epoxidized polyolefins. Also, the epoxy resin used in the present invention is by no means limited to liquids. Solid epoxy resins may also be used when used in combination with a diluent. Any of these may appropriately be used alone or in the form of a mixture of two or more. Where the following silane coupling agent is previously allowed to react with the above epoxy resin to make up the silane modified epoxy resin, joint strength can be improved and storage stability at normal temperature can be made higher.

Incidentally, to allow the silane coupling agent to react with the epoxy resin, alcohol, a small amount of pure water and a trace amount of a diluted organic acid such as acetic acid may be used, and these may be stirred with heating, followed by removal of any surplus components under reduced pressure, whereby an oligomer achievable of stable activity can be obtained through dehydration condensation reaction. Then, a metallic soap may be made present together when the silane coupling agent is allowed to reacted with the epoxy resin. This enables selective reaction of the silane coupling agent on the epoxy radical of the epoxy resin.

The silane coupling agent usable in the present invention is an organosilicon compound represented by the following general formula (1). In the general formula (1), X represents a vinyl group, an aminoalkyl group, an epoxyalkyl group, a methacrylalkyl group or the like, and R's each represent an alkoxyl group such as a methoxy group, an ethoxy group or a methoxyethoxy group.

(1)

Figure 2:
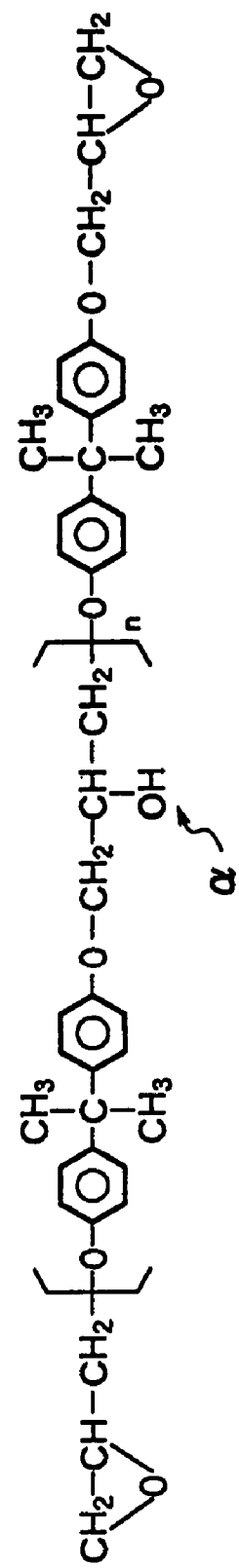
FIG. 2 illustrates the chemical structure of a bisphenol-A type epoxy resin.

Incidentally, as a preferred form of the silane modified epoxy resin, it may include a silane modified epoxy resin to part of the epoxy resin molecular structure of which a metallic soap has previously been attached by thermo-chemical reaction with the epoxy resin, i.e., the silane modified epoxy resin whose active-radical moieties other than epoxy radicals (as exemplified by the hydroxyl radical shown by an arrow α in FIG. 2) have been inactivated in part or in entirety by the aid of a metallic soap.

As the metallic soap that may be used, it may include organic acid salts formed by combination of, in addition to sodium and potassium, divalent or higher metals as exemplified by alkaline earth metals and heavy metals, such as aluminum, calcium, manganese, lead, tin and zinc, with organic acids such as octylic acid, nonylic acid, stearic acid and naphthenic acid. Any of these may be used alone or in the form of a mixture of two or more.

As the curing agent, usable are aliphatic polyamines, polyoxyalkylenediamines, and mixtures of aliphatic polyamines and polyoxyalkylenediamines or the like. However, the curing agent is by no means limited to these. Curing agents of an amine type such as aromatic amines or aliphatic amines and of an amide type may also be used as long as the resistance to heat and moisture and transparency of cured products can be satisfied. Here, curing agents other than those of the amine type or amide type, e.g., those of an acid anhydride type such as tetrahydrophthalic anhydride are not preferable because they may produce a liberation acid in a heat and moisture resistance test conducted after curing, a $BF_3$ cationic-polymerized type may anxiously liberate a Lewis acid, and further an imidazole compound type may cause coloring of cured products, and a dicyanediamide type may cause voids due to decomposed gas.

Incidentally, as a preferred form of the present invention, the amine type compound or amide type compound as the curing agent may preferably be made into a latent amine addition product upon reaction with the epoxy resin. More specifically, part of active hydrogen at the terminal amino radical in the amine type compound or amide type compound may beforehand be allowed to react with the epoxy compound to effect modification (i.e., make it into a latent amine addition product). This brings advantages that storage stability and lower curing temperature can be achieved in virtue of optimization of molecular weight and further that joint strength can be made stable. Such a modified compound may be obtained by allowing an epoxy resin equivalent weight or more of the curing agent is allowed to react at room temperature in an aqueous solution of an organic acid such as formic acid or acetic acid, and bringing the reaction mixture into contact with dilute ammonia gas or the like to effect neutralization, followed by washing with alcohol and water and then drying under reduced pressure.

Presupposing that the main component of the primary agent is, as described above, constituted of the silane modified epoxy resin whose active-radical moieties other than epoxy radicals have been inactivated in part or in entirety by the aid of a metallic soap and to at least one epoxy radical of which a silane coupling agent has been attached, the compounding proportion of the curing agent to the primary agent epoxy resin may be so set that the curing agent is in the range of from 20 parts by weight to 45 parts by weight based on 100 parts by weight of the epoxy resin.

As for the diluent, which is not an especially essential component, it must be handled with care when it is necessary to maintain suitable operability, because, if added in excess, it may make the heat resistance of cured products deteriorate to cause voids (empty spaces), separation and bleed-out at the time of curing. As to the type of the diluent, one giving a high dilution efficiency, having a superior compatibility and having neither moisture absorption nor toxicity is desirable, where, when added, there is no restriction on its amount, which depends on purposes for which the adhesive is used.

In uses of the present invention, acrylic resin, polyester resin, polyamide resin, butyral resin, phenol resin or the like may also optionally be added so that transparency and coefficient of thermal expansion can be controlled and stress relaxation properties can be added. Utilization of additives is by no means barred. What is called adjuvants such as an ultraviolet absorber, a surface-active agent, a compatibilizer, a coloring preventive agent and so forth may also be added.

The thermoset optical-purpose adhesive according to the present invention is used in, e.g., producing the optical isolator element and the optical isolator which are shown in FIG. 1. To apply this adhesive, the primary agent (resin) and the curing agent may be stirred and mixed in the stated proportion, and thereafter the mixture obtained may be applied by means of dispenser application, printing, stamping or the like, any of which may appropriately be utilized.

The present invention is specifically described below by giving Examples. Note, however, that the present invention is by no means limited to the following Examples.

EXAMPLE 1

Primary Agent:

To 100 parts by weight of epoxy resin (bisphenol-A type "EPIKOTE 823", registered trademark; epoxy resin available from Shell Chemical Co.), methanol and a trace amount of formic acid (or acetic acid) were added, and these were mixed and stirred. Thereafter, 0.5 part by weight of tin octylate was mixed which was dissolved in an organic solvent under a temperature condition of 20±5° C.

After the mixing, the mixture was heated and stirred under a condition of about 60° C. Thereafter, this was returned to normal temperature, and pure water was added thereto, followed by removal of the alcohol (methanol), the water and the formic acid (or acetic acid) by vacuum stirring.

Next, 5 parts by weight of γ-glycidoxytrimethoxysilane and some of an alcohol type solvent and pure water were added, and these were stirred in vacuo at 60±20° C. and deformed. Thereafter, this was gradually cooled by the use of a condenser to obtain a silane modified epoxy resin whose active-radical moieties other than epoxy radicals were inactivated in part or in entirety by the aid of a metallic soap and to at least one epoxy radical of which a silane coupling agent was attached.

Curing Agent:

To 100 parts by weight of bisphenol-A type epoxy resin, 60 parts by weight of menthenediamine (MDA) was added, and these were mixed and stirred at 60±5° C. in an aqueous 15% by weight acetic acid solution. Thereafter, the mixture obtained was returned to room temperature, and then neutralized with 10% by weight ammonia water. This was further washed with water and methanol, followed by distillation under reduced pressure to obtain an MDA addition product.

In 40 parts by weight of this MDA addition product, 60 parts by weight of polyoxyalkylenediamine was mixed, and these were mixed and stirred under nitrogen gas to make up a curing agent.

Then, the primary agent and the curing agent were compounded in a weight proportion of 100:25 to make up a thermoset optical-purpose adhesive according to Example 1.

Figure 3:
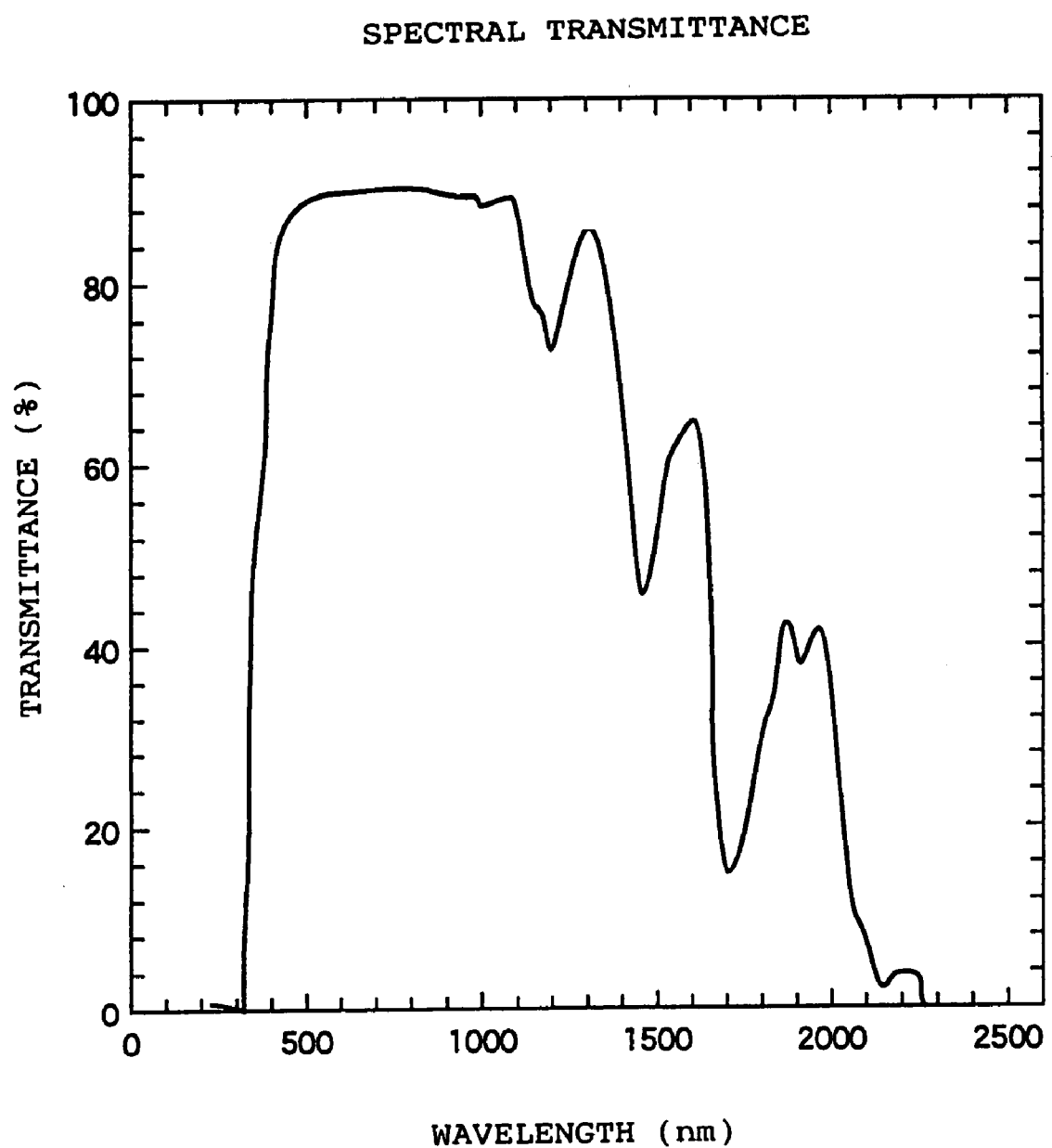
FIG. 3 is a graph showing a transmission profile of the thermoset optical-purpose adhesive according to the present invention.

Incidentally, FIG. 3 shows a transmission profile of the thermoset optical-purpose adhesive according to Example 1 in respect to rays of 200 to 2,600 nm in wavelength through a heat-cured film of 3±0.2 mm in layer thickness measured by a micrometer.

It is then conformed from this transmission profile that the thermoset optical-purpose adhesive according to Example 1 has a visible-ray transmittance of 90% or more.

More specifically, from the transmission profile shown in FIG. 3, it is conformed that this adhesive has a transmittance of 90% or more in the wavelength range of visible rays, a transmittance of about 90% at a wavelength of 1,310 nm used in optical communication, and a transmittance of about 60% at a wavelength of 1,550 nm also used in optical communication.

Incidentally, even when a temperature-humidity history (temperature: 85° C.; humidity: 85%) was applied in a heat and moisture resistance test described later, this adhesive had a transmittance of a little less than 90% at the wavelength of 1,310 nm used in optical communication, and also had a little lower transmittance of about 50% at the wavelength of 1,550 nm used in optical communication.

Here, the transmission profile was measured with a spectrophotometer U-4000, manufactured by Hitachi Ltd.

EXAMPLE 2

A thermoset optical-purpose adhesive according to Example 2 was obtained in the same way as in Example 1 except that the primary agent and the curing agent were in a weight proportion of 100:40.

EXAMPLE 3

To 80 parts by weight of the primary agent of Example 1, 20 parts by weight of bisphenol-F type epoxy resin was added, and these were stirred and mixed to make up a primary agent.

Then, this primary agent and the curing agent of Example 1 were compounded in a primary agent:curing agent weight proportion of 100:25 to obtain a thermoset optical-purpose adhesive according to Example 3.

EXAMPLE 4

A thermoset optical-purpose adhesive according to Example 4 was obtained in the same way as in Example 1 except that, as the metallic soap, "tin octylate" was changed for "copper naphthenate".

COMPARATIVE EXAMPLE 1

A thermoset optical-purpose adhesive according to Comparative Example 1 was obtained in the same way as in Example 1 except that the primary agent and the curing agent were in a weight proportion of 100:15.

COMPARATIVE EXAMPLE 2

A thermoset optical-purpose adhesive according to Comparative Example 2 was obtained in the same way as in Example 1 except that the primary agent and the curing agent were in a weight proportion of 100:55.

COMPARATIVE EXAMPLE 3

A thermoset optical-purpose adhesive according to Comparative Example 3 (i.e., a thermoset optical-purpose adhesive according to the prior art) was obtained by using epoxy resin (bisphenol-A type "EPIKOTE 823", registered trademark; epoxy resin available from Shell Chemical Co.) as the primary agent and also, as the curing agent, menthenediamine (MDA) not made into the latent amine addition product, and compounding the primary agent and the curing agent in a weight proportion of 100:55.

COMPARATIVE EXAMPLE 4

A thermoset optical-purpose adhesive according to Comparative Example 4 was obtained in the same way as in Example 1 except that the metallic soap tin octylate was not compounded.

COMPARATIVE EXAMPLE 5

The thermoset optical-purpose adhesive according to Example 1 was used, and also an evaluation sample was prepared in the same way as in Example 1 except that the layer thickness of an adhesive layer of the following evaluation sample for testing and evaluating optical properties and resistance to heat and moisture was "5.0±0.1 mm".

COMPARATIVE EXAMPLE 6

The thermoset optical-purpose adhesive according to Example 1 was used, and also an evaluation sample was prepared in the same way as in Example 1 except that the layer thickness of an adhesive layer of the following evaluation sample for testing and evaluating optical properties and resistance to heat and moisture was "1.0±0.5 μm".

Preparation of Evaluation Sample and Evaluation Test

Figure 4:
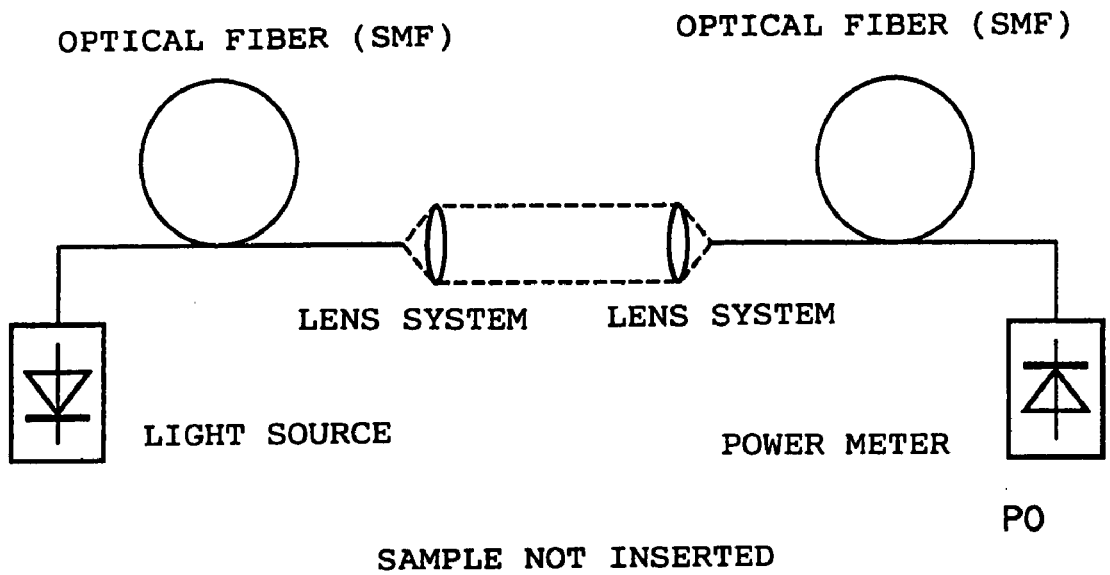
FIG. 4(A) schematically illustrates the configuration of an optical-characteristics measuring instrument, and FIG. 4(B) schematically illustrates the configuration of an optical-characteristics measuring instrument in which each sample (each of optical isolator elements obtained using thermoset optical-purpose adhesives according to Examples and Comparative Examples) has been inserted in the space of the respective lens systems.
Figure 4:
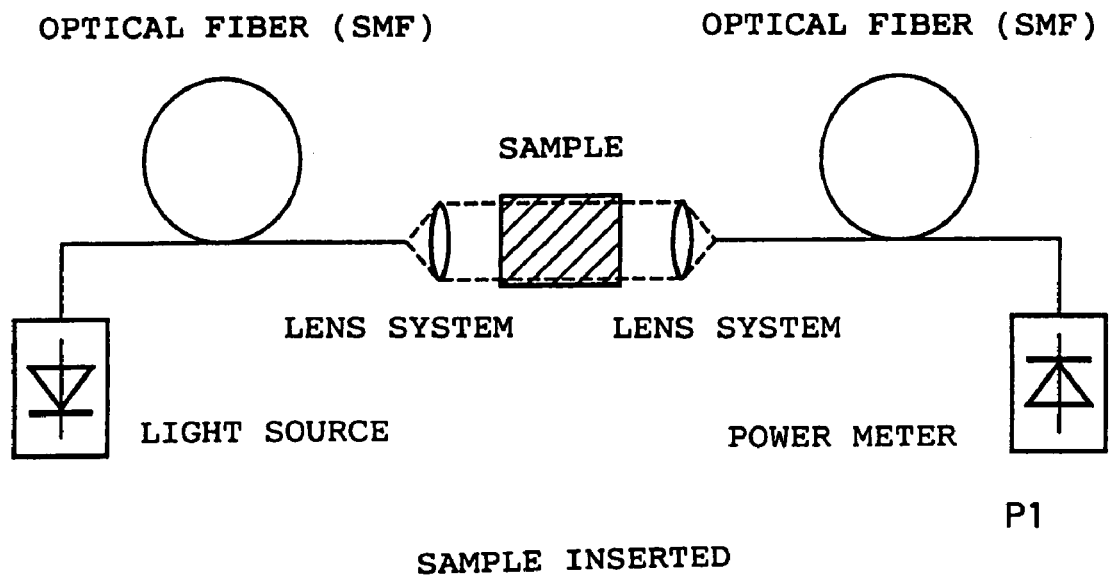

Optical Properties:

The optical isolator element and the optical isolator which are shown in FIG. 1 were produced using the thermoset optical-purpose adhesive according to each Example and Comparative Example, and the insertion loss and isolation of the optical isolator produced using the thermoset optical-purpose adhesive according to each Example and Comparative Example were measured with an optical-properties measuring instrument shown in FIG. 4(A), constituted mainly of a light source, an optical fiber (SMF), a light incident side lens system, a light emergent side lens system, an optical fiber (SMF) and a power meter.

More specifically, as shown in FIG. 4(B), a sample (an optical isolator element constituted mainly of the first polarizer 1, an adhesive layer of 0.5±0.1 mm in layer thickness, the Faraday rotator 2, an adhesive layer of 0.5±0.1 mm in layer thickness and the second polarizer 3) was inserted between the light incident side lens system and the light emergent side lens system to measure the insertion loss and the isolation.

Then, its optical characteristics were measured on the basis of numerical values in "ASTM-D-524 Test" to see whether they were good or bad. The results are shown in Tables 1 and 2 below.

Here, evaluation criteria are as follows:

Evaluation Criteria

AA: Excellent.

A: On the level that is feasible for practical use.

C: Infeasible for practical use.

Figure 5:
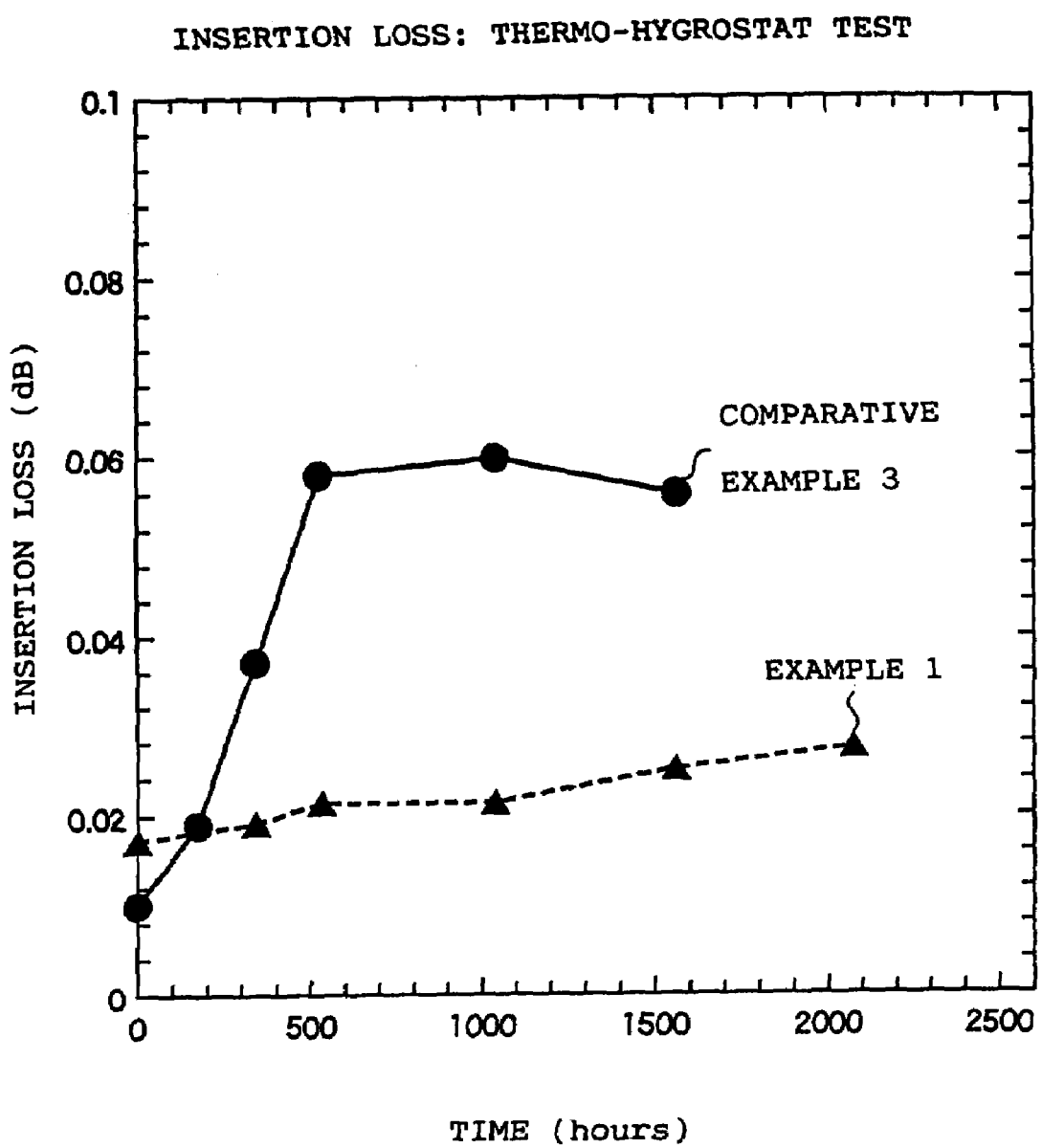
FIG. 5 is a graph showing changes in optical characteristics (insertion loss) after application of a temperature-humidity history (temperature: 85° C.; humidity: 85%), of optical isolator elements obtained using thermoset optical-purpose adhesives according to Example 1 and Comparative Example 3.

Incidentally, in respect of the thermoset optical-purpose adhesive according to Example 1 and the thermoset optical-purpose adhesive according to Comparative Example 3, optical characteristics (insertion loss) after application of a temperature-humidity history (temperature: 85° C.; humidity: 85%) in the following heat and moisture resistance test, i.e., optical characteristics (insertion loss) in a thermo-hygrostat test were also measured. The results are shown in FIG. 5.

Heat and Moisture Resistance Test:

Onto a substrate made of the same material SUS stainless steel as the holder 5, a Faraday rotator chip (1.0 mm square, and 0.5 mm in thickness) was fastened by bonding, using the thermoset optical-purpose adhesive according to each Example and Comparative Example. This was left for 2 hours in an oven heated to 120° C., to effect heat curing to prepare an evaluation sample. On each of an evaluation sample to which the temperature-humidity history was applied at a temperature of 85° C. and a humidity of 85% for 2,000 hours and an evaluation sample to which the same was not applied, the chip was pressed in the horizontal direction by means of a push-pull gauge, and its peel strength (N: newton) was measured. Then, the peel strength was judged by the value A obtained according to the following expression (1).

$A =$ [peel strength (N) of the evaluation sample to which the temperature-humidity history was applied]/[peel strength (N) of the evaluation sample to which no temperature-humidity history was applied]×100 (%).     Expression (1)

Evaluation Criteria

AA: A is 80% or more.

A: A is from 65% or more to less than 80%.

B: A is from 50% or more to less than 65%.

C: A is less than 50%.

Pot Life Evaluation:

The primary agent and the curing agent were mixed at room temperature (25° C.), and the time was measured by which the viscosity came twice that immediately after mixing.

Evaluation Criteria

AA: 3 hours or more.

A: From 2 hours to less than 3 hours.

B: From 1 hour to less than 2 hours.

C: Less than 1 hour.

TABLE 1

| | | Example Sample No.: | | | |
|---|---|---|---|---|---|
| Composition of adhesive | | 1 | 2 | 3 | 4 |
| Primary agent (a): | | | | | |
| Epoxy resin | | 100 | 100 | 80/20 | 100 |
| Silane coupling agent | | 5 | 5 | 5 | 5 |
| Metallic soap: | Type | Tin octylate | Tin octylate | Tin octylate | Copper naphthenate |
| | Weight ratio | 0.5 | 0.5 | 0.5 | 0.5 |
| Weight ratio of (a):curing agent: | | 100:25 | 100:40 | 100:25 | 100:25 |
| Evaluation sample | | | | | |
| adhesive-layer thickness (mm): | | 0.5 | 0.5 | 0.5 | 0.5 |
| Characteristics | | | | | |
| Optical characteristics: | | AA | AA | AA | AA |
| Resistance to heat and moisture: | | AA | AA | AA | AA |
| Pot time evaluation: | | AA | AA | AA | AA |

TABLE 2

| | | Comparative Example Sample No.: | | | | | |
|---|---|---|---|---|---|---|---|
| Composition of adhesive | | 1 | 2 | 3 | 4 | 5 | 6 |
| Primary agent (a): | | | | | | | |
| Epoxy resin | | 100 | 100 | 100 | 100 | 100 | 100 |
| Silane coupling agent | | 5 | 5 | 0 | 5 | 5 | 5 |
| Metallic soap: | Type | Tin octylate | Tin octylate | — | — | Tin octylate | Tin octylate |
| | Weight ratio | 0.5 | 0.5 | 0 | 0 | 0.5 | 0.5 |
| Weight ratio of (a):curing agent: | | 100:15 | 100:55 | 100:55 | 100:25 | 100:25 | 100:25 |
| Evaluation sample | | | | | | | |
| adhesive-layer thickness (mm): | | 0.5 | 0.5 | 0.5 | 0.5 | 5 | 0.001 |
| Characteristics | | | | | | | |
| Optical characteristics: | | A | C | C | A | A | AA |
| Resistance to heat and moisture: | | B | A | C | B | AA | C |
| Pot time evaluation: | | AA | C | A | AA | AA | AA |

Confirmation:

1. From the evaluation of the characteristics shown in Tables 1 and 2, it is confirmed that the thermoset optical-purpose adhesives according to Examples have superiority to the thermoset optical-purpose adhesives according to Comparative Examples in respect of the optical characteristics, the resistance to heat and moisture and the pot life evaluation.

Also confirmed is the following: Comparative Example 1 is so set that "the primary agent and the curing agent were in a weight proportion of 100:15", where the curing agent is in a weight proportion of 20 parts by weight or less, and hence the adhesive has a difficulty in resistance to heat and moisture (evaluated as "B") compared with respective Examples. Comparative Example 2 is so set that "the primary agent and the curing agent were in a weight proportion of 100:55", where the curing agent is in a weight proportion of 45 parts by weight or more, and hence it affords a difficulty in optical characteristics (evaluated as "C") compared with respective Examples, and the pot life is also evaluated to be no good ("C").

Comparative Example 3 is a thermoset optical-purpose adhesive according to the prior art and the curing agent is in a weight proportion of 45 parts by weight or more. Hence, it affords a difficulty in optical characteristics (evaluated as "C"), and also has a poor affinity for the inorganic optical device (Faraday rotator chip) to have a difficulty in resistance to heat and moisture (evaluated as "C") compared with respective Examples.

Still also confirmed is the following: Comparative Example 4 is an adhesive in which the metallic soap tin octylate is not compounded, and hence the silane coupling agent γ-glycidoxytrimethoxysilane has been attached not only to epoxy radicals but also to active moieties other than the epoxy radicals. As the result, the adhesive has a difficulty in resistance to heat and moisture (evaluated as "B") compared with respective Examples, and also affords optical characteristics inferior ("C") to those of respective Examples.

Further confirmed is the following: Comparative Examples 5 and 6 each make use of the thermoset optical-purpose adhesive according to Example 1, and hence, in the both, the pot life is evaluated like that in respective Examples ("AA") However, the layer thicknesses of their adhesive layers are "5.0±0.1 mm" in Comparative Example 5 and "1.0±0.5 µm" in Comparative Example 6, which do not satisfy the stated layer thickness condition. Hence, in Comparative Example 5 the optical characteristics are inferior ("A") to that of respective Examples, and in Comparative Example 6 the resistance to heat and moisture is poor ("C").

2. As is confirmed from the results of the heat and moisture resistance test which are shown in FIG. 5, in the case when the thermoset optical-purpose adhesive according to Example 1 is used, the optical characteristics (insertion loss) can not easily deteriorate even after application of the temperature-humidity history (temperature: 85° C.; humidity: 85%), whereas, in the case when the thermoset optical-purpose adhesive according to Comparative Example 3 is used, the optical characteristics (insertion loss) has greatly deteriorated after application of the temperature-humidity history (temperature: 85° C.; humidity: 85%).

POSSIBILITY OF INDUSTRIAL APPLICATION

As described above, the thermoset optical-purpose adhesive according to the present invention provides, after curing, the cured products with superior resistance to heat and moisture and superior transparency. Hence, where, e.g., this adhesive is used in optical isolator elements and optical isolators, it has the effect of making the optical isolator elements and permanent magnets not easily come separate from the holder because of deterioration of the adhesive and making optical deterioration not easily occur because of peeling of the Faraday rotator and polarizers. It also has the effect of enabling achievement of cost reduction in virtue of power saving in manufacturing steps. Therefore, it is suited to be uses as an optical-purpose adhesive used in producing, e.g., optical component parts such as optical isolator elements and optical isolators.

The invention claimed is:

1. A thermoset optical-purpose adhesive comprising a mixed adhesive which is mainly composed of a primary agent and a curing agent, and has a visible-ray transmittance of 90% or more after heat curing under conditions of a layer thickness that is enough for the adhesive to function as an adhesive;

characterized in that:
the primary agent comprises a main component constituted of a silane modified epoxy resin whose active-radical moieties other than epoxy radicals have been inactivated in part or in entirety by the aid of a metallic soap and to at least one epoxy radical of which a silane coupling agent has been attached; and
the curing agent comprises a main component constituted of an amine type compound or an amide type compound.

2. The thermoset optical-purpose adhesive according to claim 1, wherein said amine type compound or amide type compound constituting the main component of said curing agent has been made into a latent amine addition product upon reaction with the epoxy resin.

3. The thermoset optical-purpose adhesive according to claim 2, wherein the compounding proportion of said curing agent to 100 parts by weight of said primary agent epoxy resin is set within the range of from 20 parts by weight to 45 parts by weight.

4. An optical isolator element constituted mainly of a Faraday rotator, and a first polarizer and a second polarizer which are respectively disposed on both sides of the Faraday rotator, wherein;
said Faraday rotator, said first polarizer and said second polarizer are joined at their interfaces by means of the thermoset optical-purpose adhesive according to claim 3.

5. An optical isolator comprising an optical isolator element and a permanent magnet which brings into saturation magnetization a Faraday rotator of this optical isolator element; the optical isolator element and the permanent magnet being fastened to a holder; wherein;
said optical isolator element and said permanent magnet are fastened by bonding to the holder by means of the thermoset optical-purpose adhesive according to claim 3.

6. An optical isolator element constituted mainly of a Faraday rotator, and a first polarizer and a second polarizer which are respectively disposed on both sides of the Faraday rotator, wherein;
said Faraday rotator, said first polarizer and said second polarizer are joined at their interfaces by means of the thermoset optical-purpose adhesive according to claim 2.

7. An optical isolator comprising an optical isolator element and a permanent magnet which brings into saturation magnetization a Faraday rotator of this optical isolator element; the optical isolator element and the permanent magnet being fastened to a holder; wherein;
said optical isolator element and said permanent magnet are fastened by bonding to the holder by means of the thermoset optical-purpose adhesive according to claim 2.

8. The thermoset optical-purpose adhesive according to claim 1, wherein the compounding proportion of said curing agent to 100 parts by weight of said primary agent epoxy resin is set within the range of from 20 parts by weight to 45 parts by weight.

9. An optical isolator element constituted mainly of a Faraday rotator, and a first polarizer and a second polarizer which are respectively disposed on both sides of the Faraday rotator, wherein;

said Faraday rotator, said first polarizer and said second polarizer are joined at their interfaces by means of the thermoset optical-purpose adhesive according to claim 8.

10. An optical isolator comprising an optical isolator element and a permanent magnet which brings into saturation magnetization a Faraday rotator of this optical isolator element; the optical isolator element and the permanent magnet being fastened to a holder; wherein;

said optical isolator element and said permanent magnet are fastened by bonding to the holder by means of the thermoset optical-purpose adhesive according to claim 8.

11. An optical isolator element constituted mainly of a Faraday rotator, and a first polarizer and a second polarizer which are respectively disposed on both sides of the Faraday rotator, wherein;

said Faraday rotator, said first polarizer and said second polarizer are joined at their interfaces by means of the thermoset optical-purpose adhesive according to claim 1.

12. An optical isolator comprising an optical isolator element and a permanent magnet which brings into saturation magnetization a Faraday rotator of this optical isolator element; the optical isolator element and the permanent magnet being fastened to a holder; wherein;

said optical isolator element and said permanent magnet are fastened by bonding to the holder by means of the thermoset optical-purpose adhesive according to claim 1.

* * * * *